United States Patent [19]

Padovani

[11] 4,207,360
[45] Jun. 10, 1980

[54] SILICON SEED PRODUCTION PROCESS
[75] Inventor: Francois A. Padovani, Dallas, Tex.
[73] Assignee: Texas Instruments Incorporated, Dallas, Tex.
[21] Appl. No.: 627,635
[22] Filed: Oct. 31, 1975
[51] Int. Cl.$^2$ .................... B05D 7/00; C23C 11/06
[52] U.S. Cl. .................. 427/213; 427/86; 427/314; 423/348; 423/349; 423/350; 427/215; 427/248.1
[58] Field of Search .............. 427/213, 215, 86, 314, 427/248 R; 423/348, 349, 350

[56] References Cited
U.S. PATENT DOCUMENTS

| | | | |
|---|---|---|---|
| 3,012,861 | 12/1961 | Ling | 427/213 |
| 3,012,862 | 12/1961 | Bertrand | 427/213 |
| 3,419,416 | 12/1968 | Batiuk et al. | 427/213 |

FOREIGN PATENT DOCUMENTS

| | | | |
|---|---|---|---|
| 696248 | 10/1964 | Canada | 427/213 |
| 899900 | 6/1962 | United Kingdom | 427/213 |

Primary Examiner—Michael F. Esposito
Attorney, Agent, or Firm—Gary C. Honeycutt; James T. Comfort; Rene' E. Grossman

[57] ABSTRACT

In the production of elemental silicon by chemical vapor deposition on a particulate seed bed, the continuous generation of seed particles for use or recycle is achieved by the maintenance of a separate, subsidiary reaction zone at a temperature which favors breakage of product particles; while a higher temperature, favorable for deposition, is maintained in the principal reaction zone. The separate reaction zones may be established in separate reactors, or in a single reactor.

10 Claims, 2 Drawing Figures

SILICON SEED PRODUCTION PROCESS

This application relates to the production of elemental silicon by chemical vapor deposition on a bed of silicon seed particles, and more particularly to a method for the generation or regeneration of seed particles for use or recycle in the process.

Elemental silicon of electronic purity can be obtained by contacting a bed of silicon seed particles at elevated temperature with a hydrogen stream containing a reducible silicon compound such as a silicon halide or a halosilane. As described in U.S. Pat. No. 3,012,862 such a process involves the charging of silicon seed particles having a 40–100 mesh screen size to a suitable reactor wherein the seed particles can be fluidized and maintained at temperatures ranging from 950°–1250° C. Hydrogen and trichlorosilane, for example, in a mole ratio of about 20:1 are passed through the bed at a rate sufficient to fluidize the seed particle bed while depositing additional elemental silicon thereon by hydrogen reduction of the trichlorosilane or other reducible silicon compound.

One advantage of the process has been the feature of continuously or semicontinuously removing enlarged silicon particles therefrom as a product of the process, while concurrently adding seed particles to replenish the fluidized bed. In order to fully implement this advantage, however, a suitable method for generating seed particles is required. The usual technique of crushing or grinding and sieving to obtain seed particles presents some difficulty from an economic viewpoint, and also due to the inherent contamination which results from such handling. Accordingly, it is an object of the present invention to provide an improved process for the production of pure elemental silicon by chemical vapor deposition on a particulate seed bed, wherein the seed particles can be continuously or intermittently generated and/or regenerated as an integral part of the principal process.

The invention is embodied in a method for the production of elemental silicon beginning with the step of contacting a first particulate bed of silicon particles, at a temperature substantially below 1000° C., with a fluidizing stream of gaseous hydrogen or other inert gas. The invention is based in part on the discovery that the fluidization of silicon particles at temperatures below 1000° C. is inherently conducive to a relatively high breakage rate, caused by thermal and mechanical stresses. Therefore, advantage is taken of the breakage rate in order to generate smaller silicon particles, useful as a seed material in a separate reaction zone for the deposition of silicon on the seed particles.

The next step of the method of the invention comprises the contacting of a second particulate bed of silicon particles, at a temperature substantially above 1000° C., with a fluidizing stream of gaseous hydrogen containing a reducible silicon compound. The reaction zone must be maintained above 1000° C. in order to favor hydrogen reduction of the reducible silicon compound, whereby rapid enlargement of the seed particles occurs through chemical vapor deposition of fresh silicon, recoverable as the primary product of the process. At temperatures optimum for deposition, the breakage rate is essentially zero. The high breakage rate at lower temperatures is believed due to the brittleness of silicon at temperatures below the plasticity point, i.e., below 1000° C.

Although the essence of the invention does not require that any deposition of silicon occur in the breakage zone, it is preferred to include a reducible silicon compound in the charge thereto, so that advantage may be taken of some deposition therein, and so that the gaseous effluent from the first particulate bed can be utilized with greater advantage as a charge stream to the second particulate bed. The economic advantage of so utilizing the effluent will be apparent, and therefore constitutes an advantageous feature of the preferred embodiment of the invention.

The method also includes the step of separating relatively small silicon particles from the first particulate bed to be used as seed particles in the second particulate bed. Such separation may be achieved through the inherent gravitational segregation which causes the heavier particles to predominate in the lower portion of the bed while the smaller silicon particles predominate in the upper region of the bed. Such gravitational segregation permits the seed particles to be transported overhead in the effluent gases for transfer into the second particulate bed. Alternate separation schemes and other means for transferring the seed particles to the main reaction zone also are encompassed within the scope of the invention.

The primary product of the method is recovered in the form of enlarged silicon particles produced within the second particulate bed. Here again, the inherent gravitational segregation which will occur in any such particulate bed permits such enlarged product particles to be removed from a lower portion of the second particulate bed.

Although the concept of the invention is complete without an additional step it will be apparent that the product removed from the second particulate bed is a suitable and convenient source of large particles to be added to the first particulate bed for the generation or regeneration of additional seed particles.

In one embodiment of the invention the first and second particulate beds are located in separate reactors, which permits totally independent temperature control and facilitates the maintenance of truly optimum conditions for breakage in the first bed, together with the maintenance of truly optimum conditions for deposition in the second particulate bed.

In an alternate embodiment, the second particulate bed is superimposed above the first particulate bed in a single reactor. Although a perforated plate may be used between the upper and lower beds to provide a more positive separation of the two beds, no physical means for separation is required. That is, a single bed may be employed, and a temperature gradient established therein to maintain an upper zone at 1050°–1300° C. and a lower zone at 800°–1000° C. Some intermingling of the two beds in an intermediate zone will naturally occur, however, the inherent gravitational segregation of particle sizes is sufficiently pronounced that the larger particles will remain in the lower zone, and newly generated seed particles will be carried from the lower zone to the upper zone by entrainment in the gas flow.

Although the close proximity of the two beds limits to some extent the independence of temperature control, overall thermal efficiency is enhanced. Thus, it is possible to maintain a sufficient temperature difference between the upper and lower beds, as required to cause sufficient seed particle generation in the lower bed, while concurrently maintaining near-optimum conditions for deposition in the upper bed.

When the two beds are located in a single reactor, it is again preferred to include the reducible silicon compound in the charge to the first bed, whereby some deposition of silicon will occur in the breakage zone, and the unreacted charge will then pass directly into the second bed. It is also feasible to supplement the silicon compound content of the gaseous flow as it passes from the lower bed to the upper bed thereby permitting independent control of reactant ratios in the two beds.

Figure 1:
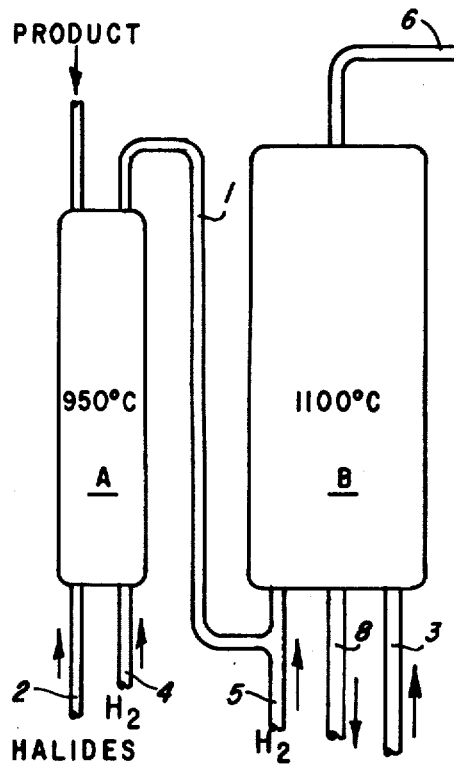
FIG. 1 is a diagrammatic view of one embodiment of the invention, wherein the two beds are located in separate reactors.

In FIG. 1, reactor A contains the first bed of fluidized silicon particles, maintained at 800°–1000° C., for example, about 950° C., which has been determined to favor breakage due to mechanical and thermal stresses caused by fluidization. The smaller particles produced by such breakage are separated overhead and passed, by entrainment in line 1, as seed particles to reactor B, wherein a second bed of silicon is maintained at a temperature of 1050°–1300° C., for example, about 1100° C., which favors the deposition of silicon product on the seed particles. One or more silicon halide reactants are passed through line 3, and optionally through line 2 as well, while $H_2$ is passed through lines 4 and 5. Spent gases are removed through line 6. Product is removed through line 8.

Figure 2:
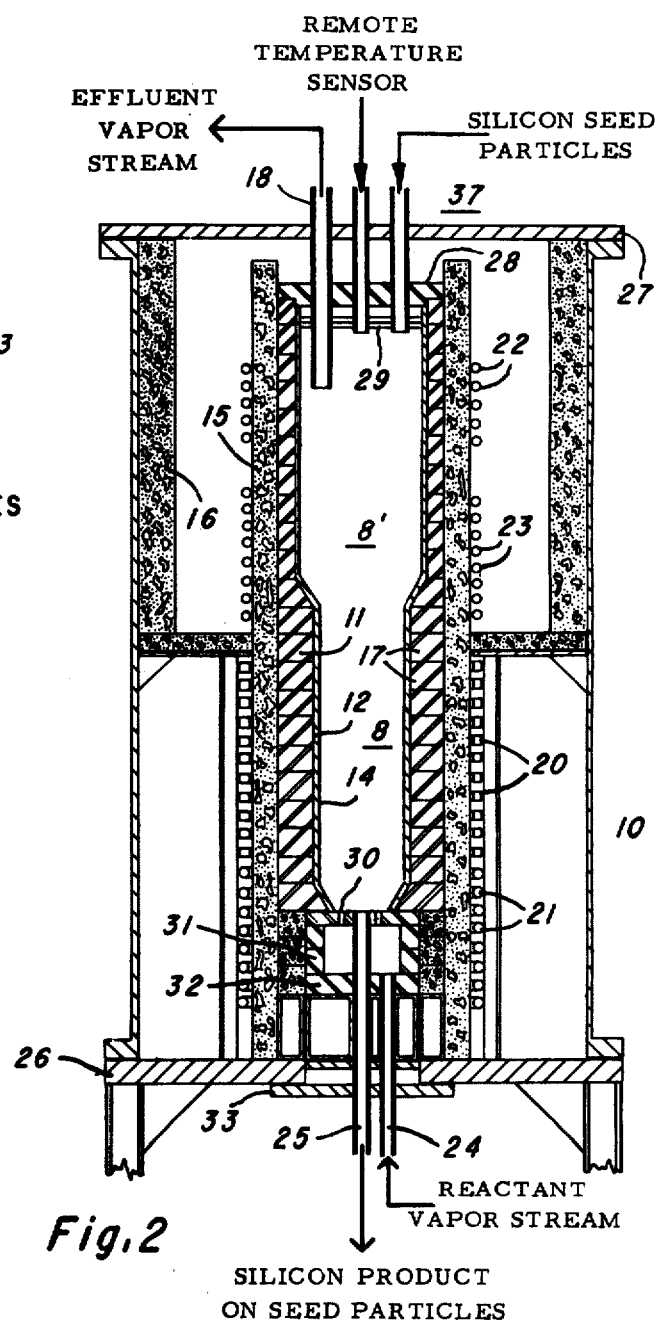
FIG. 2 is a cross-section of the reactor of a second embodiment of the invention, wherein the two beds are located in the same reactor.

Another embodiment of the invention is illustrated in FIG. 2. In this embodiment a metal support housing 10 is sealed by a lower support plate 26 and an upper plate 27. The reactor includes a graphite liner 11 surrounding the lower reaction zone 8 and upper zone 8' which is comprised of graphite bricks or tiles 17 bonded together and sealing the reaction zone by silicon carbide formed within the crevices between the bricks or tiles 17. A silicon carbide layer 14 is also formed on the inner surface 12 of the liner 11. The reaction zone is sealed on the bottom by a graphite plug comprised of an upper distribution plate 30, sidewalls 31 and a lower plug 32. The graphite liner is also sealed at the top by a graphite plug 28. A graphite radiation shield 29 protects the plug 28 from radiation produced in the reaction zone. The lower plug comprised of the graphite parts 30, 31 and 32, is removable for maintenance purposes by removing plate 33 which is normally removably sealed to the plate 26. The graphite liner 11 is surrounded by a firewall 15 which functions to contain the heat within the reaction zone. The firewall is preferably comprised of a cast silica material which is placed within the metal housing 10 and the graphite liner 11 formed within the firewall 15. In this particular embodiment, the heat for the lower reaction zone is provided by the graphite liner in cooperation with induction coils 21 surrounding the firewall in the area of the lower reaction zone 8. Induction current passing through the coils causes the graphite liner to be heated and maintain the reaction temperature within the lower reaction zone 8. The induction coils 21 are hollow for passing a coolant through the coils during reactor operation. Additional cooling coils 20 are also provided for passing a coolant only. Separate induction coils 22 and 23 are used for heating the upper reaction zone 8' to maintain a higher temperature than in zone 8. A second firewall 16 surrounding the upper reaction zone is utilized to retain the heat within the housing 10.

In operation, a first bed of silicon particles is maintained in fluidized suspension by the reactant vapor stream including $H_2$ plus trichlorosilane, for example, passing through distribution plate 30, into the reaction zone 8. A second bed of silicon particles is suspended in zone 8'. Silicon product particles having a predetermined quantity of deposited silicon thereon are continuously or semicontinuously removed through silicon product outlet 25 in the lower portion of the reactor. An effluent vapor outlet 18 is also provided for removal of unreacted reactants and the by-products hydrogen halide.

Through the effect of gravitational segregation, there is a continous downward migration of larger particles, 40 to 100 mils in diameter, from the upper bed to the lower bed as the particles grow in size from silicon deposition thereon; while there is concurrently a migration of smaller particles, 20 to 40 mils in diameter, upward from the lower bed to the upper bed, as breakage in the lower bed causes a generation or regeneration of new seed particles.

Although repeated reference is made herein to "fluidized" particulate beds, it will be apparent that the invention is not limited to the use of a classic state of fluidization. That is, a gas flow velocity substantially above the optimum required to fluidize the particles is useful in the first bed to cause a greater degree of agitation, which is conducive to an increased breakage rate. Also, increased agitation is useful in the second bed to minimize bonding between two or more adjacent particles. For example, gas flow rates of 12–20 l./min. per square inch of reactor cross sectional area are useful in each bed, and preferably about 14–16 l./min/per square inch.

Although specific examples of the present invention have been described and illustrated along with examples of materials of construction and desired configuration, it should be understood that these are not intended to limit the scope of the invention. Since it is obvious that many additional changes and modifications can be made in the above-described details without departing from the nature and spirit of the invention, only the appended claims are determinative of its true scope.

What is claimed is:

1. A method for the production of elemental silicon comprising the steps of:
   contacting a first particulate bed of silicon particles at a temperature between 900° and 950° C. with a stream of fluidizing gas at a velocity which favors some breakage of particles;
   contacting a second particulate bed of silicon particles at a temperature substantially above 1000° C. with a stream of gaseous hydrogen containing a reducible silicon compound;
   separating relatively small silicon particles from said first bed and adding them to said second bed; and
   recovering relatively large silicon particles from said second bed as a product of the method.

2. A method as in claim 1 wherein said second bed is located above said first bed in the same reactor.

3. A method as in claim 1 wherein the effluent gases from said first bed are passed in contact with said second bed.

4. A method as in claim 1 wherein the temperature of said second bed is 1100°–1250° C.

5. A method as in claim 1 wherein said relatively small particles have an average diameter of less than 40 mils.

6. A method as in claim 1 wherein said relatively large particles have a diameter greater than 40 mils.

7. A method as in claim 1 wherein the velocity of gases passed in contact with said first bed is sufficient to cause fluidization.

8. A method as in claim 3 wherein said second bed is located above said first bed in the same reactor.

9. A method as in claim 4 wherein said second bed is located above said first bed in the same reactor.

10. A method as in claim 1 wherein a portion of the large particles recovered from said second bed are added to said first bed for the production of additional seed material.

* * * * *